United States Patent
Boisset et al.

(10) Patent No.: US 11,358,420 B2
(45) Date of Patent: Jun. 14, 2022

(54) METHOD FOR CONTROLLING AN ELECTRONIC VALVE FOR A TIRE OF A MOTOR VEHICLE AND ASSOCIATED DEVICE

(71) Applicant: Continental Automotive GmbH, Hannover (DE)

(72) Inventors: Jean-Philippe Boisset, Toulouse (FR); Aurélien Malard, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/167,315

(22) Filed: Feb. 4, 2021

(65) Prior Publication Data
US 2021/0245559 A1    Aug. 12, 2021

(30) Foreign Application Priority Data
Feb. 7, 2020 (FR) .................................... 2001201

(51) Int. Cl.
*B60C 23/04* (2006.01)
(52) U.S. Cl.
CPC ...... *B60C 23/0454* (2013.01); *B60C 23/0462* (2013.01); *B60C 23/0479* (2013.01)
(58) Field of Classification Search
CPC ............ B60C 23/0454; B60C 23/0462; B60C 23/0479; B60C 23/00; G01L 17/00
USPC ................................ 340/447, 440, 442, 443
See application file for complete search history.

(56) References Cited

U.S. PATENT DOCUMENTS

| | | | |
|---|---|---|---|
| 10,350,949 B2 * | 7/2019 | Surendra | B60C 23/0471 |
| 10,821,788 B2 * | 11/2020 | Van Wiemeersch | B60C 23/0406 |
| 2012/0176233 A1 * | 7/2012 | Petrucelli | B60C 23/0496 340/447 |
| 2018/0308191 A1 * | 10/2018 | Matthiesen | G01C 21/3438 |
| 2019/0225034 A1 | 7/2019 | Van Wiemeersch et al. | |
| 2019/0255893 A1 | 8/2019 | Van Wiemeersch et al. | |

OTHER PUBLICATIONS

French Search Report and Written Opinion for Application No. 2001201, dated May 28, 2020, 8 pages (French).

* cited by examiner

*Primary Examiner* — Eric Blount
(74) *Attorney, Agent, or Firm* — RatnerPrestia

(57) ABSTRACT

A method for controlling an electronic valve for a tire of a motor vehicle including an electronic assembly of sensors and a bidirectional radiofrequency communication assembly, connected to the electronic assembly of sensors. This method is noteworthy in that: in a parked situation and in the effective absence of a user, the electronic assembly of sensors is kept dormant and the communication assembly is kept on standby, and on the arrival of a user, the electronic assembly of sensors is activated by the communication assembly.

10 Claims, 2 Drawing Sheets

[Fig. 1]
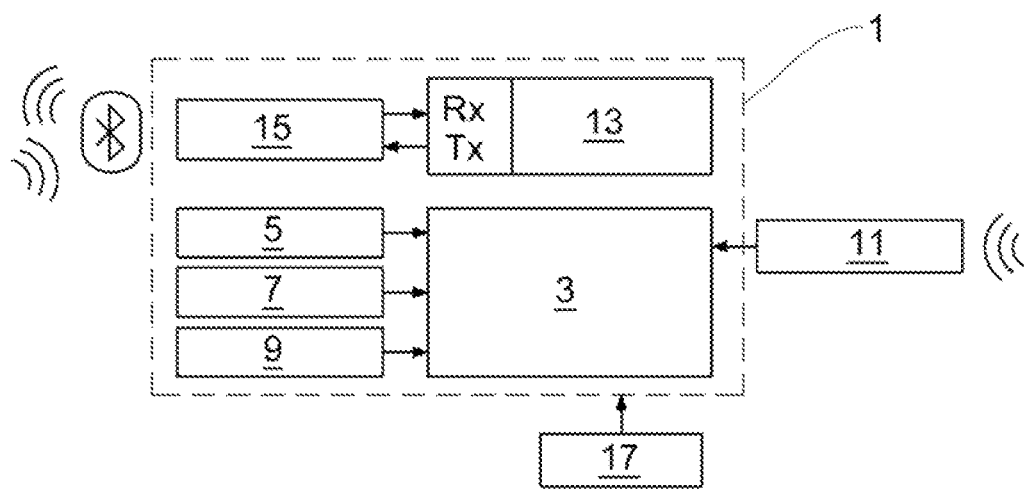
[Fig. 2]
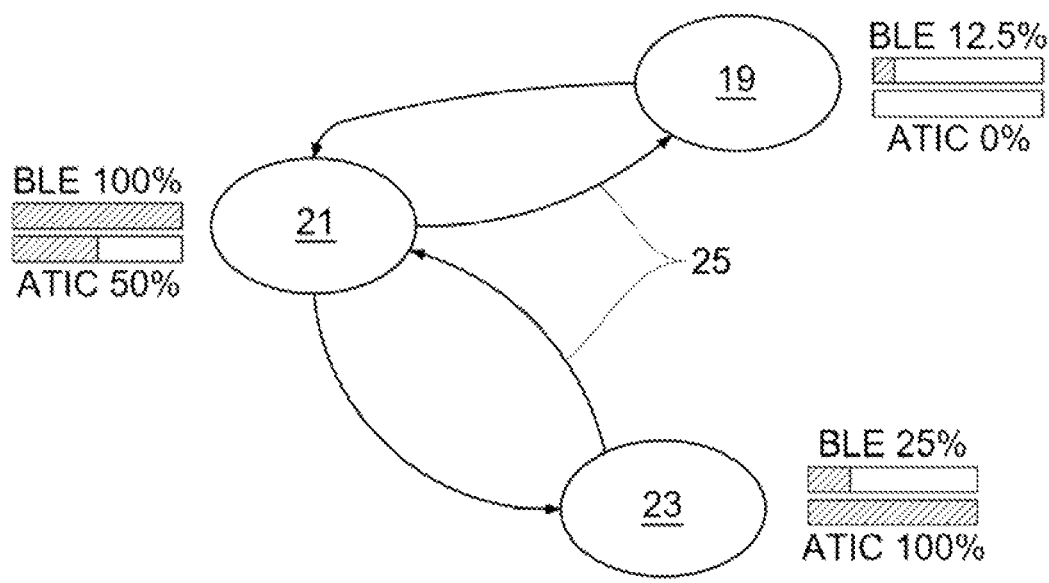

[Fig. 3]
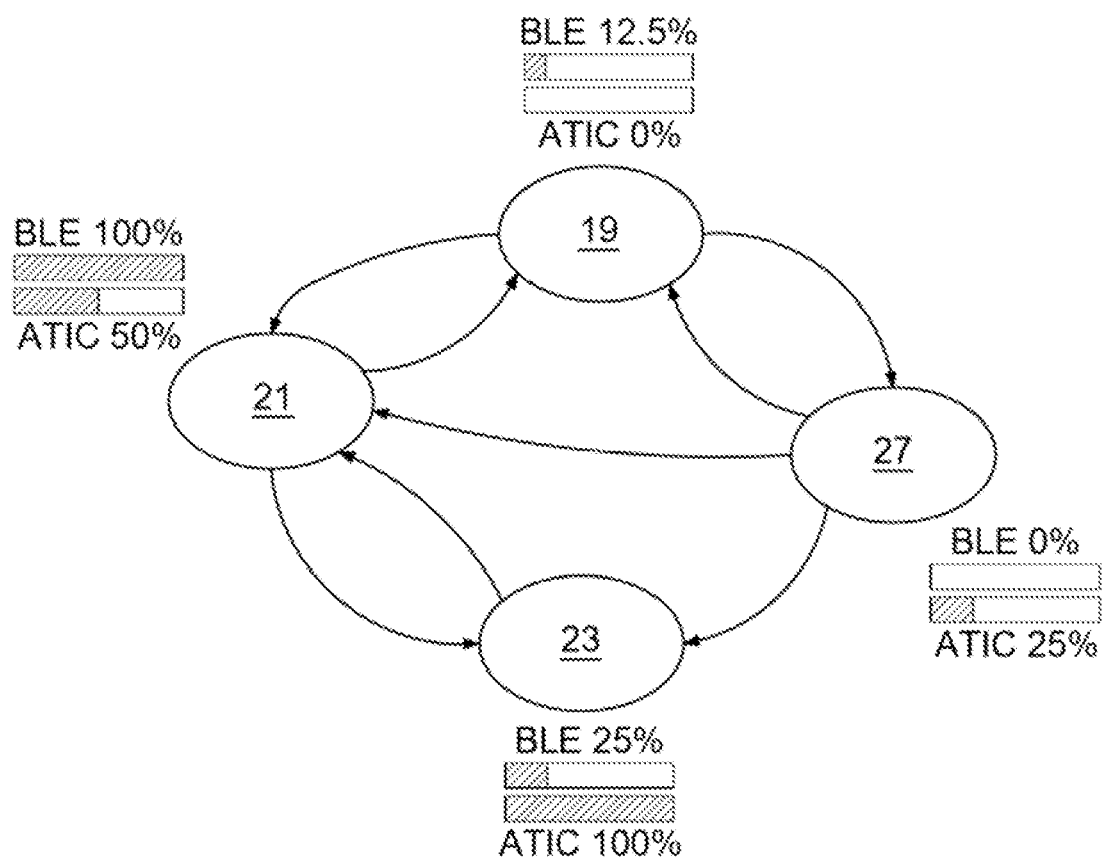

METHOD FOR CONTROLLING AN ELECTRONIC VALVE FOR A TIRE OF A MOTOR VEHICLE AND ASSOCIATED DEVICE

CROSS REFERENCE TO RELATED APPLICATIONS

This application claims priority to French Patent Application No. 2001201, filed Feb. 7, 2020, the contents of such application being incorporated by reference herein.

FIELD OF THE INVENTION

The present invention relates to a method for controlling an electronic valve for a tire of a motor vehicle, and to an electronic valve suitably programmed to implement this method.

BACKGROUND OF THE INVENTION

Electronic valves for a vehicle tire, called "TPMSs", comprising temperature, pressure, and movement (accelerometer) sensors are known from the prior art.

These electronic valves communicate with the onboard electronics of the vehicle, in order to get information regarding in particular the state of the tires to the driver.

Until recently, these electronic valves, supplied with power by cells, communicated unidirectionally with the onboard electronics of the vehicle.

Efforts have been made to develop means for bidirectional communication with these electronic valves, in particular in order to be able to reprogram them, and to be able to communicate information to them relating to the environment in which the vehicle is driving, such as for example signaling the approach of an aquaplaning region.

These efforts have led to the integration of a bidirectional radiofrequency communication chip inside the electronic valve.

This chip, which may typically be of Bluetooth® type and operate in the 2.4 GHz frequency range, communicates with the microcontroller that drives the temperature, pressure, and movement sensors.

The drawback of such a chip is that it has a high power consumption, which is not very compatible with the service life requirements of the cell installed inside the electronic valve, which typically has to operate for between 8 and 10 years.

SUMMARY OF THE INVENTION

An aspect of the present invention provides means allowing the consumption of the cell of the electronic valve to be decreased when this valve comprises a bidirectional radiofrequency communication chip such as a Bluetooth® chip.

An advantage of an aspect of this invention as well as other advantages, are achieved by virtue of a method for controlling an electronic valve for a tire of a motor vehicle comprising an electronic assembly of sensors and a bidirectional radiofrequency communication assembly, connected to said electronic assembly of sensors, this method being noteworthy in that:

in a parked situation and in the effective absence of a user, said electronic assembly of sensors is kept dormant and said communication assembly is kept on standby, and on the arrival of a user, said electronic assembly of sensors is activated by means of said communication assembly.

By virtue of these features of putting the bidirectional communication assembly on standby, it is possible to decrease its transmission frames to the minimum when the vehicle is in a parked situation and in the absence of a user, i.e. in practice for about 95% of the service life of a vehicle.

The arrival of the user in the vehicle in a parked situation may be detected for example through the approach of an electronic device such as a smartphone held by the user, or else through an event transmitted by the electronics onboard the vehicle: the opening of a door, the detection of a presence by a presence sensor arranged inside the vehicle, or even through the starting up of the vehicle.

According to other, optional features of the method according to an aspect of the invention, taken individually or in combination:

on the arrival of a user, said bidirectional communication assembly is made to operate at full capacity and said assembly of sensors is made to operate at partial capacity: in such a situation of the presence of a user in proximity to or in the vehicle in a parked situation, corresponding in reality to about 0.5% of the service life of a vehicle, it is possible to benefit from the full service capacity offered by the bidirectional communication assembly while ensuring that physical events are detected (motion detection, pressure warning, etc.). This assembly may thus communicate for example with a smartphone held by the user;

furthermore:

in a parked situation and in the foreseeable absence of a user, said communication assembly is kept dormant, said electronic assembly of sensors is activated periodically in order to detect any movement of the vehicle indicating the presence of a user at an unforeseen time, and said communication assembly is activated as appropriate;

by virtue of these optional features, the bidirectional communication assembly may be put completely to sleep for periods identified as being those when the user usually does not use their vehicle, wakeup being performed periodically, but at time intervals that are spaced as far apart as possible, by the assembly of sensors; the bidirectional communication assembly being activated only at the end of the foreseeable period of absence of the user, or else as appropriate in the event of early request by the assembly of sensors, makes it possible to decrease the power consumption of this communication assembly to the minimum;

the arrival of a user is detected by virtue of an electronic device borne by this user, or present on the vehicle and capable of communicating with said communication assembly: such an electronic device may be for example a telephone or smartphone held by the user, registered beforehand and capable of communicating with the bidirectional communication assembly and/or with the assembly of sensors;

a communication between said electronic device and said communication assembly is authorized only if said electronic device is included on a list of authorized devices stored in said communication assembly: the use of such a list makes it possible to prevent electronic devices held by unauthorized persons from being able to enter into communication with the bidirectional communication assembly; such a situation could arise through the communication of electronic devices of passers-by, or through the onboard electronics of a vehicle passing in proximity to the electronic valve;

the arrival of a user is detected through the starting up of said vehicle via the onboard electronics of the vehicle: in this way it is possible to detect the arrival of a user independently of whether they are bearing an electronic device such as a smartphone;

radiofrequency request frames are transmitted by said communication assembly when it is on standby at a frequency 5 to 10 times lower—and preferably 8 times lower—than its transmit frequency in fully active mode: such decreased transmission of request frames makes it possible to decrease the power consumed by the bidirectional communication assembly to the minimum.

An aspect of the present invention also relates to an electronic valve for a tire of a motor vehicle comprising an electronic assembly of sensors and a bidirectional radiofrequency communication assembly, noteworthy in that said electronic assembly of sensors and/or said communication assembly are suitably programmed to implement the method as described above: such an electronic valve makes it possible, without significant change of hardware, and by virtue of straightforward programming, to implement this method.

According to other optional features of this electronic valve, said communication assembly is an assembly of Bluetooth® type: such an assembly has the advantage of being available "off the shelf", and of offering a communication protocol that is recognized by most electronic devices such as smartphones.

BRIEF DESCRIPTION OF THE DRAWINGS

Other features and advantages of an aspect of the invention will become apparent from reading the following non-limiting description, with reference to the appended drawings, in which:

FIG. 1 schematically shows the various electronic members of an electronic valve according to an aspect of the invention;

FIG. 2 schematically shows the operating diagram of the method according to an aspect of the invention, according to a first variant;

FIG. 3 schematically shows the operating diagram of the method according to an aspect of the invention, according to a second variant.

For greater clarity, identical or similar elements are denoted by identical or similar reference signs throughout the figures.

DETAILED DESCRIPTION OF THE PREFERRED EMBODIMENTS

Reference is now made to FIG. 1, which shows the main electronic members installed inside an electronic valve according to an aspect of the invention.

These members are arranged inside a housing 1 that is intended to be housed inside the tire of a motor vehicle, also called an electronic module 1.

Inside the housing 1 there is a microcontroller 3 that communicates with the pressure 5, temperature 7, movement 9 sensors.

The movement sensor 9 is generally an accelerometer, and it should be noted that other sensors may also be envisaged.

In practice, the microcontroller 3 and the sensors 5, 7, 9 form an ASIC chip, i.e. an integrated circuit dedicated to particular functions, which will be referred to in the context of an aspect of the present invention as the "assembly of sensors".

The microcontroller 3 is connected to a low-frequency antenna 11, suitable for receiving in the 125 kHz range.

The microcontroller 3 is electrically connected to a bidirectional communication chip 13, such as a Bluetooth® chip, capable of communicating with the outside by virtue of an antenna 15 in both directions, i.e. both transmission and reception.

The microcontroller 3 and the chip 13 are supplied with power by a cell 17, the service life of which is typically desired to be between 8 and 10 years.

The purpose of the electronic module 1 that has just been described is first of all to communicate, to the electronics onboard the vehicle, information representative of the state of the tire (temperature, pressure) and also the situation of the vehicle (at standstill or in motion, by virtue of the accelerometer 9).

Additionally, by virtue of the bidirectional communication capability of the Bluetooth® chip 13, it is also possible to redefine the operating mode of this chip, and of the microcontroller 3, and/or to send the electronic module 1 information representative of the environment in which the vehicle is driving, such as the foreseeable presence of an aquaplaning region, which may lead to the modification of certain signals generated by the sensors 5, 7, 9.

As indicated in the preamble of the present description, a drawback of this type of electronic valve is that the power consumption of the bidirectional communication assembly 13, 15 is high, and not very compatible with the expected service life of the cell 17.

To overcome this problem, an aspect of the present invention proposes placing the Bluetooth® chip 13 in sleep mode when the vehicle is in a parked situation, and in the absence of a user, which corresponds in practice to 95% of the service life of a vehicle.

In this situation, indicated by the reference 19 in FIG. 2, it is typically possible to envisage that the Bluetooth® chip transmits request frames only at 12.5% of its full capacity, i.e. typically every 16 seconds, instead of every 2 seconds in normal operation.

During this time, the assembly of sensors is off, which is indicated by the notes BLE 12.5% and ATIC 0%, respectively, in FIG. 2.

When the presence of a user is detected while the vehicle is in a parked situation, as indicated by the reference 21 in FIG. 2, the Bluetooth® chip wakes up and operates at full capacity, i.e. it transmits request frames every two seconds, and awaits the responses that may come for example from an electronic device such as a smartphone held by the user or from the onboard electronics in the vehicle (ECU for "electronic control unit").

The Bluetooth® chip then wakes up the assembly of sensors, which may monitor the physical quantities (pressure, temperature, acceleration), with a view to transmitting, via Bluetooth®, an event or a physical quantity to the onboard electronics of the vehicle as well as a certain amount of necessary information, while operating for example at 50% of its capacity, i.e. by carrying out the monitoring every 32 seconds, if it is assumed that, at full capacity, this assembly of sensors transmits frames spaced apart by 16 seconds.

This is indicated by the notes BLE 100% and ATIC 50% in FIG. 2.

Next, when the vehicle enters driving mode, which typically represents of the order of 5% of the service life of a vehicle, and which is indicated by the reference 23 in FIG. 2, the Bluetooth® chip drops back to about 25% of its operating capacity, i.e. it transmits request frames every 8 seconds, and may thus communicate with the onboard electronics of the vehicle and/or with the smartphone of the user in order to offer a service provision that strikes a good compromise between power consumption and the expected level of service.

In driving mode, the assembly of sensors then operates at 100% of its capacity, i.e. it typically measures the physical quantities at intervals of 16 seconds, so as to bring to the attention of the user, via the frames from the Bluetooth® chip, up-to-date information in particular on the state of the tires of the vehicle.

The transition from one to the other of the situations 19, 21, 23 is reversible, which is indicated by the bidirectional arrows 25.

Now referring to FIG. 3, it is possible to see a variant which provides a refinement with respect to the preceding embodiment.

In this variant, there is an additional state 27 in which the Bluetooth® chip 13 is completely dormant, only the assembly of sensors then being on standby, typically at 25% of its full capacity.

This therefore means that this assembly of sensors monitors the physical quantities (the acceleration to detect motion, and the pressure to detect a pressure warning) approximately every 64 seconds.

This additional state 27 is defined according to the vehicle usage habits of its user.

By virtue of the Bluetooth® chip which allows bidirectional communication, the electronic module 1 learns over time which periods are those when it is highly likely that the vehicle will not be used.

During these periods, the Bluetooth® chip 13 being on standby is therefore unnecessary, and it is sufficient to occasionally request that the assembly of sensors send a signal from the accelerometer 9 in order to ensure that the vehicle is indeed in a situation of standstill, and not unusually in motion.

If ever unusual motion, i.e. motion occurring outside of the normal usage habits of the vehicle, is detected, then it is possible to switch to one or the other of the situations 21 or 23 described above, in which the Bluetooth® chip 13 is activated at full capacity or at partial capacity, respectively.

In the usual operating mode, there is a transition from state 27 to state 19 when the vehicle is about to be used, in accordance with the habits of the user.

Advantageously, it will be ensured that the Bluetooth® chip 13 may communicate only with certain electronic devices included on a predetermined list, in particular in order to prevent unwanted communications between this chip and smartphones other than that of an authorized user.

As may be understood in the light of the preceding description, an aspect of the present invention allows the Bluetooth® chip to be called upon minimally, by virtue of strategies of putting this chip on standby, or even to sleep, in those situations when the vehicle is not in operation, which in practice represent the vast majority of the service life of this vehicle.

In this way it is possible to optimize the service life of the cell that supplies the electronic valve with power, while guaranteeing the user a highly satisfactory level of service.

Of course, an aspect of the invention is described in the above by way of example. It is understood that those skilled in the art are able to produce different variant embodiments of the invention without thereby departing from the scope of the invention.

The invention claimed is:

1. A method for controlling an electronic valve for a tire of a motor vehicle comprising an electronic assembly of sensors and a bidirectional radiofrequency communication assembly, connected to said electronic assembly of sensors, the method comprising:
   when the motor vehicle is parked and a user is not detected in proximity to the motor vehicle, said electronic assembly of sensors is kept dormant and said bidirectional radiofrequency communication assembly operates in a first mode where said bidirectional radiofrequency communication assembly transmits connection requests at a first rate; and
   upon detection of a user in proximity to the motor vehicle, said bidirectional radiofrequency communication assembly activates said electronic assembly of sensors, and said bidirectional radiofrequency communication assembly operates in a second mode where said bidirectional radiofrequency communication assembly transmits connection requests at a second rate that is greater than the first rate.

2. The method as claimed in claim 1, wherein, upon detection of a user, said bidirectional radiofrequency communication assembly is made to operate at full capacity and said assembly of sensors is made to operate at partial capacity.

3. A method for controlling an electronic valve for a tire of a motor vehicle comprising an electronic assembly of sensors and a bidirectional radiofrequency communication assembly, connected to said electronic assembly of sensors, the method comprising:
   when the motor vehicle is parked and a user is not detected in proximity to the motor vehicle, keeping said bidirectional radiofrequency communication assembly dormant, and activating said electronic assembly of sensors periodically in order to detect any movement of the vehicle indicating the presence of a user, and
   when a user is detected in proximity to the motor vehicle, activating said bidirectional radiofrequency communication assembly.

4. The method as claimed in claim 1, wherein upon detection of a user is detected by virtue of an electronic device borne by this user, or present on the vehicle and capable of communicating with said bidirectional radiofrequency communication assembly.

5. The method as claimed in claim 4, wherein a communication between said electronic device and said bidirectional radiofrequency communication assembly is authorized only if said electronic device is included on a list of authorized devices stored in said bidirectional radiofrequency communication assembly.

6. The method as claimed in claim 1, wherein upon detection of a user is detected through the starting up of said vehicle via the onboard electronics of the vehicle.

7. The method as claimed in claim 1, wherein radiofrequency request frames are transmitted by said bidirectional radiofrequency communication assembly when operating in the a first mode at a frequency 5 to 10 times lower than its transmit frequency in fully active mode.

8. An electronic valve for a tire of a motor vehicle comprising:
   an electronic assembly of sensors; and
   a bidirectional radiofrequency communication assembly,
   when the motor vehicle is parked and a user is not detected in proximity to the motor vehicle, said electronic assembly of sensors is configured to be kept dormant and said bidirectional radiofrequency communication assembly is configured to operate in a first mode where said bidirectional radiofrequency communication assembly transmits connection requests at a first rate; and upon detection of a user in proximity to the motor vehicle, said bidirectional radiofrequency communication assembly is configured to activate said electronic assembly of sensors, and said bidirectional radiofrequency communication assembly is configured to operate in a second mode where said bidirectional radiofrequency communication assembly transmits connection requests at a second rate that is greater than the first rate.

9. The electronic valve as claimed in claim 8, wherein said bidirectional radiofrequency communication assembly is an assembly of Bluetooth® type.

10. The method as claimed in claim 1, wherein radiofrequency request frames are transmitted by said bidirectional radiofrequency communication assembly when operating in the a first mode at a frequency 8 times lower than its transmit frequency in fully active mode.

\* \* \* \* \*